United States Patent
Ansley (10) Patent No.: US 8,957,939 B1
(45) Date of Patent: Feb. 17, 2015

(54) METHOD AND APPARATUS FOR A VIDEOPHONE

(75) Inventor: Carol J. Ansley, Johns Creek, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 451 days.

(21) Appl. No.: 13/283,699

(22) Filed: Oct. 28, 2011

Related U.S. Application Data (60) Provisional application No. 61/407,995, filed on Oct. 29, 2010.

(51) Int. Cl.
*H04N 7/14* (2006.01)

(52) U.S. Cl.
USPC .................................... 348/14.04; 379/93.17

(58) Field of Classification Search
USPC ........................... 348/14.01, 14.04; 379/93.17
See application file for complete search history.

(56) References Cited

U.S. PATENT DOCUMENTS

| | | | | |
|---|---|---|---|---|
| 5,371,534 A | * | 12/1994 | Dagdeviren et al. | 348/14.01 |
| 5,448,286 A | * | 9/1995 | Decaesteke et al. | 348/14.12 |
| 5,920,693 A | * | 7/1999 | Burkman et al. | 709/204 |
| 6,148,072 A | * | 11/2000 | Huang | 379/219 |
| 6,243,448 B1 | * | 6/2001 | Corbett et al. | 379/93.35 |
| 6,262,978 B1 | * | 7/2001 | Bruno et al. | 370/260 |
| 6,853,713 B1 | * | 2/2005 | Fobert et al. | 379/142.17 |
| 7,043,749 B1 | * | 5/2006 | Davies | 725/120 |
| 7,099,288 B1 | * | 8/2006 | Parker et al. | 370/259 |
| 7,221,384 B2 | * | 5/2007 | Mueller et al. | 348/14.01 |
| 7,590,227 B2 | * | 9/2009 | Kim | 379/93.17 |
| 7,894,581 B2 | * | 2/2011 | Sylvain et al. | 379/93.17 |
| 8,428,232 B2 | * | 4/2013 | Garcia | 379/142.17 |
| 8,488,591 B2 | * | 7/2013 | Miali et al. | 370/352 |
| 8,619,953 B2 | * | 12/2013 | Nietfeld et al. | 379/93.21 |
| 2006/0040638 A1 | * | 2/2006 | McQuaide, Jr. | 455/403 |
| 2007/0121584 A1 | * | 5/2007 | Qiu et al. | 370/352 |
| 2007/0160045 A1 | * | 7/2007 | Payyappilly et al. | 370/390 |
| 2011/0273526 A1 | * | 11/2011 | Mehin et al. | 348/14.01 |
| 2011/0289201 A1 | * | 11/2011 | Lochbaum et al. | 709/223 |

\* cited by examiner

*Primary Examiner* — Olisa Anwah
(74) *Attorney, Agent, or Firm* — Troy A. Van Aacken (57) ABSTRACT

Methods, systems, and apparatus can provide videophone communications though the introduction of a video device and upgrade of a CPE device providing packetized voice communication. The video portion of the videophone call can be displayed on standard devices. Other implementations provide improvements through integration with a set-top box.

16 Claims, 8 Drawing Sheets

METHOD AND APPARATUS FOR A VIDEOPHONE

RELATED APPLICATIONS

This application claims priority as a non-provisional utility of U.S. Provisional Patent Application Ser. No. 61/407,995, entitled "Improved Method and Apparatus for a Videophone", filed Oct. 29, 2010, which is incorporated herein by reference in its entirety.

TECHNICAL FIELD

This disclosure relates to providing videophone functionality.

BACKGROUND

Videophones were demonstrated at the 1964 New York World's Fair to the public, allowing fair attendees to conduct videophone calls to remote users. While video conferencing has gained acceptance and use in the business world, widespread consumer acceptance has not occurred.

The adoption of broadband services encompassing video, internet access and voice services have been widespread in the consumer marketplace. Thereby, utilizing the underlying components and network connectivity to offer an economical quality videophone service is possible.

SUMMARY

Systems and methods can operate to provide videophone services with commercially available and installed CPE (Customer Premise Equipment) offering packetized telephony services through upgrading the CPE software operating image and interfacing to a local device (e.g., a video device) with video functionality. Systems can include an external network operable to provide network communication services, a user network operable to provide local area network communication services, a commercially available CPE device operable to provide packet based telephony and data services through the external network, and communication with local devices through the user network, a local device operable to display video information to a display device wherein, video information is received from the CPE device through the user network, and the local device being further operable to capture and provide packet video information to the CPE device through the user network, and wherein the CPE device is operable to provide a videophone service to the local device by modifying only its operating software image.

Methods can include upgrading an operating software image on a deployed CPE device to provide a videophone services, the deployed CPE device being incapable of providing videophone services prior to the upgrade, establishing a packet based telephony service between a first CPE device and a second CPE device over a external network, requesting a packet based videophone service from the first CPE device to the second CPE device over the external network, notifying the first CPE device if the videophone service is accepted or rejected from the second CPE device, and establishing a videophone service between the first and second CPE devices.

BRIEF DESCRIPTION OF THE DRAWINGS

Like reference numbers and designations in the various drawings indicate like elements.

DETAILED DESCRIPTION

In some implementations of this disclosure, methods, systems, and apparatus can operate with the introduction of a local device to use existing telephones and display devices to provide videophone communication services through upgrading commercially available CPE devices providing a packetized voice service.

Figure 1:
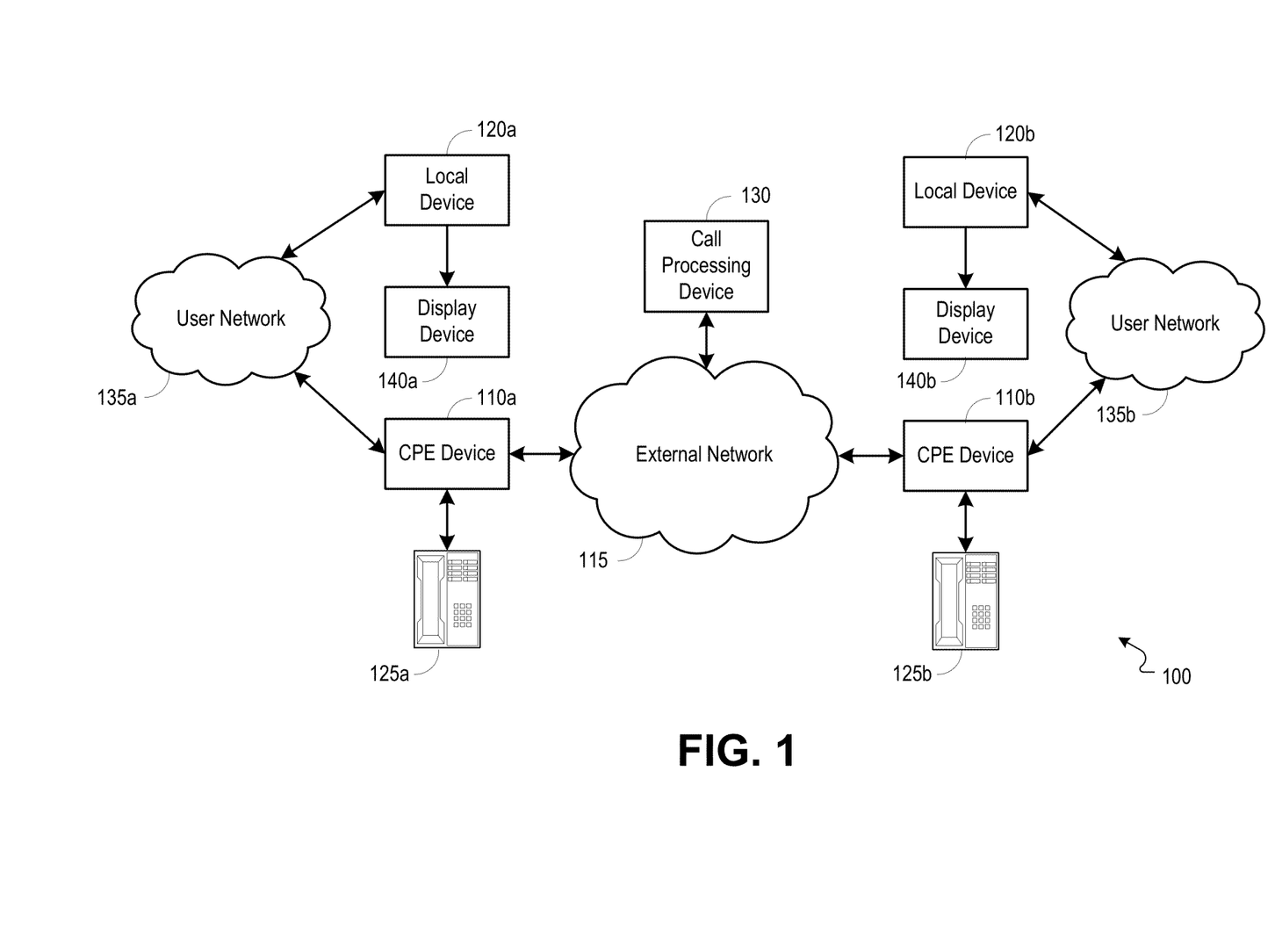
FIG. 1 is a block diagram illustrating an example network environment operable to provide videophone service.

FIG. 1 is a block diagram illustrating an example network environment operable to provide videophone services. In some implementations, customer premise equipment (CPE) devices 110a-b can provide packetized voice communication services through external network 115. With the addition of local devices 120a-b, external network 115 can provide videophone functionality between users located at telephones 125a and 125b. Thereby, videophone services can be provided by existing CPE devices 110a-b through upgrading their operating software images to utilize the local device 120a-b. External network 115 can be an internet protocol (IP), asynchronous transfer mode (ATM) or other packet switched based metro area network (MAN) or wide area network (WAN). Access to the external network 115 can be provided through a hybrid fiber coax (HFC) cable (e.g., DOCSIS), fiber or digital line subscriber (i.e., DSL, ADSLx, VDSLx, etc. . . . ) networks, or combinations thereof.

Call processing device 130 can be used to setup a call between phone 125a and phone 125b. Call processing device 130 can provide control plane functionality for sending and receiving control information to or from CPE devices 110a and 110b to set up a voice call. Once the call has been set up, CPE devices 110a and 110b can exchange voice packets enabling a voice communication between phones 125a and 125b.

Local devices 120a-b can provide a video camera capable of full motion images. Local devices 120a-b can packetize the video for transmission to the respective CPE devices 110a-b through the respective user network 135a-b. In some implementations user network 135a-b can be wired, wireless or a combination of both. Wired network implementations can include ethernet, MoCA (Multimedia over Cable Alliance) or power line based networks. Wireless network implementations can include 802.11 or G.hn. CPE devices 110a-b can send command information to local devices 130a-b to initiate or terminate generation of video packets. Video capture devices 120a-b can receive packets containing video information for viewing on display devices 140a-b. In other implementations CPE devices 110a-b can send both video and audio information to video capture devices 140a-b for projection on display devices 140a-b. The format of received video packets can be the same as transmitted. The display devices 140a-b can be standard television sets or monitors.

Figure 2:
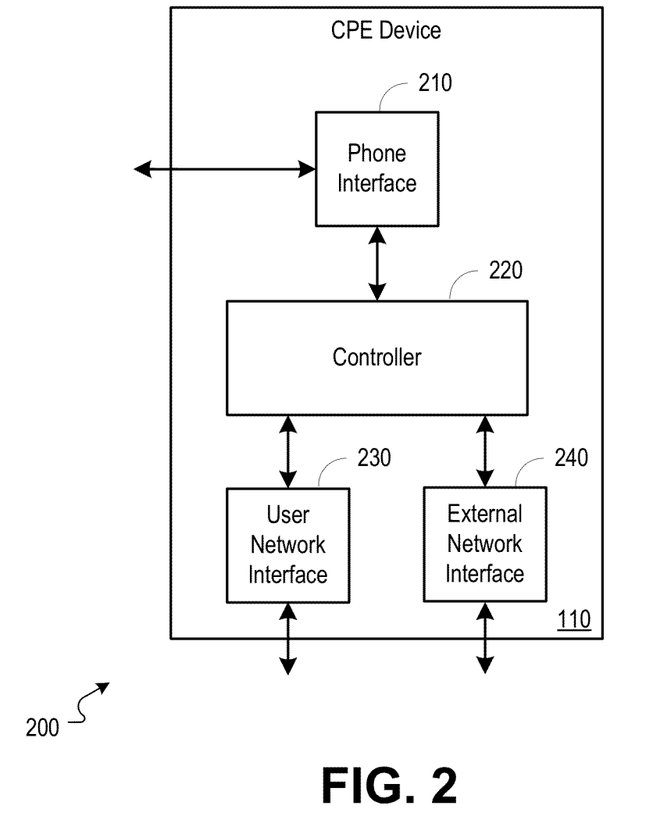
FIG. 2 is a block diagram illustrating a customer premise device (CPE) device operable to provide videophone service.

FIG. 2 is a block diagram illustrating a customer premise device (CPE) device (e.g., CPE device 110 of FIG. 1) operable to provide videophone service. A phone interface 210 can be used to connect the CPE device (e.g., CPE device 110 of FIG. 1) to a standard telephone (e.g., telephone 125 of FIG. 1). The phone interface 210 can transmit or receive digitized voice packets to and from controller 220.

A controller 220 can provide control, application and packet processing functions for the phone interface 210, a user network interface 230, and an external network interface 240. The user network interface 230 can provide connectivity between the CPE device (e.g., CPE device 110 of FIG. 1) and a local device (e.g., local device 120 of FIG. 1). The user network interface 230 can transmit or receive digitized video packets to or from the controller 220.

An external network interface 240 can provide connectivity between CPE devices (e.g., CPE devices 110 of FIG. 1) to provide videophone services through the external network (e.g., external network 115 of FIG. 1). The external network interface 240 can provide and receive digitized voice and video packets to or from the controller 220.

Figure 3:
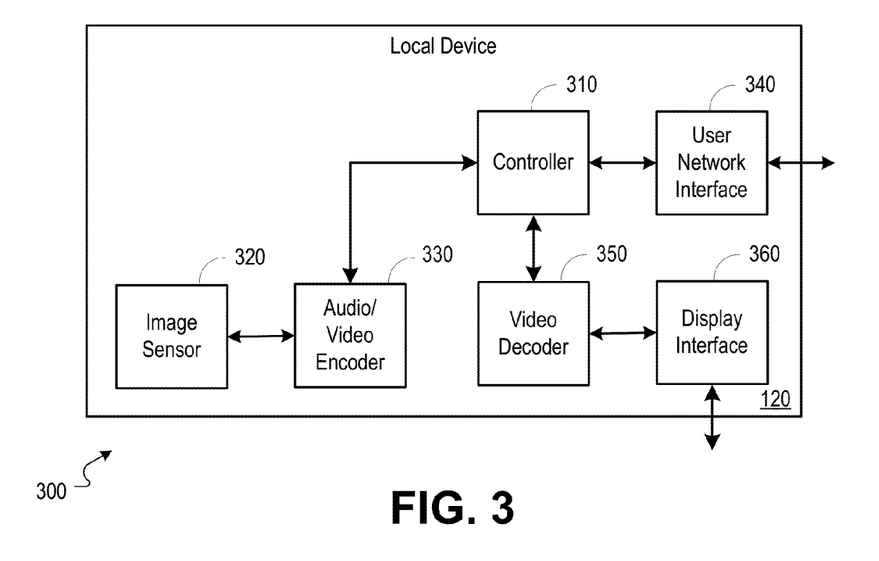
FIG. 3 is a block diagram illustrating a video device.

FIG. 3 is a block diagram illustrating a local device (e.g., local device 120 of FIG. 1). A controller 310 can provide video packet processing and control for an image sensor 320, a video encoder 330, a user network interface 340, an audio/video decoder 350 and a display interface 360.

Image sensor 320 can provide video images to the video encoder 330. The video encoder 330 can provide digitized video information for processing and packetizing by controller 330. Packetized video formats can include, for example, among many others: MJPEG, MPEG1, MPEG2, MPEG4, DV, H.264, SMTPE or various proprietary implementations. The user network interface 340 can transmit the video packets to a CPE device (e.g., CPE device 110 of FIG. 1).

The local device (e.g., local device 120 of FIG. 1) can receive video packets from a CPE device (e.g., CPE device 110 of FIG. 1) through the user network interface 340. The video packets can be provided to the controller 310 for de-packetizing and processing. The audio/video decoder 350 can receive digitized video signals for decoding and provide to the display interface 360. In other implementations, the audio/video decoder 350 can receive digitized video/audio signals for decoding and provide to the display interface 360. The display interface 360 can support HDMI, component video, S-Video, video (single RCA plug) or VGA interfaces.

Figure 4:
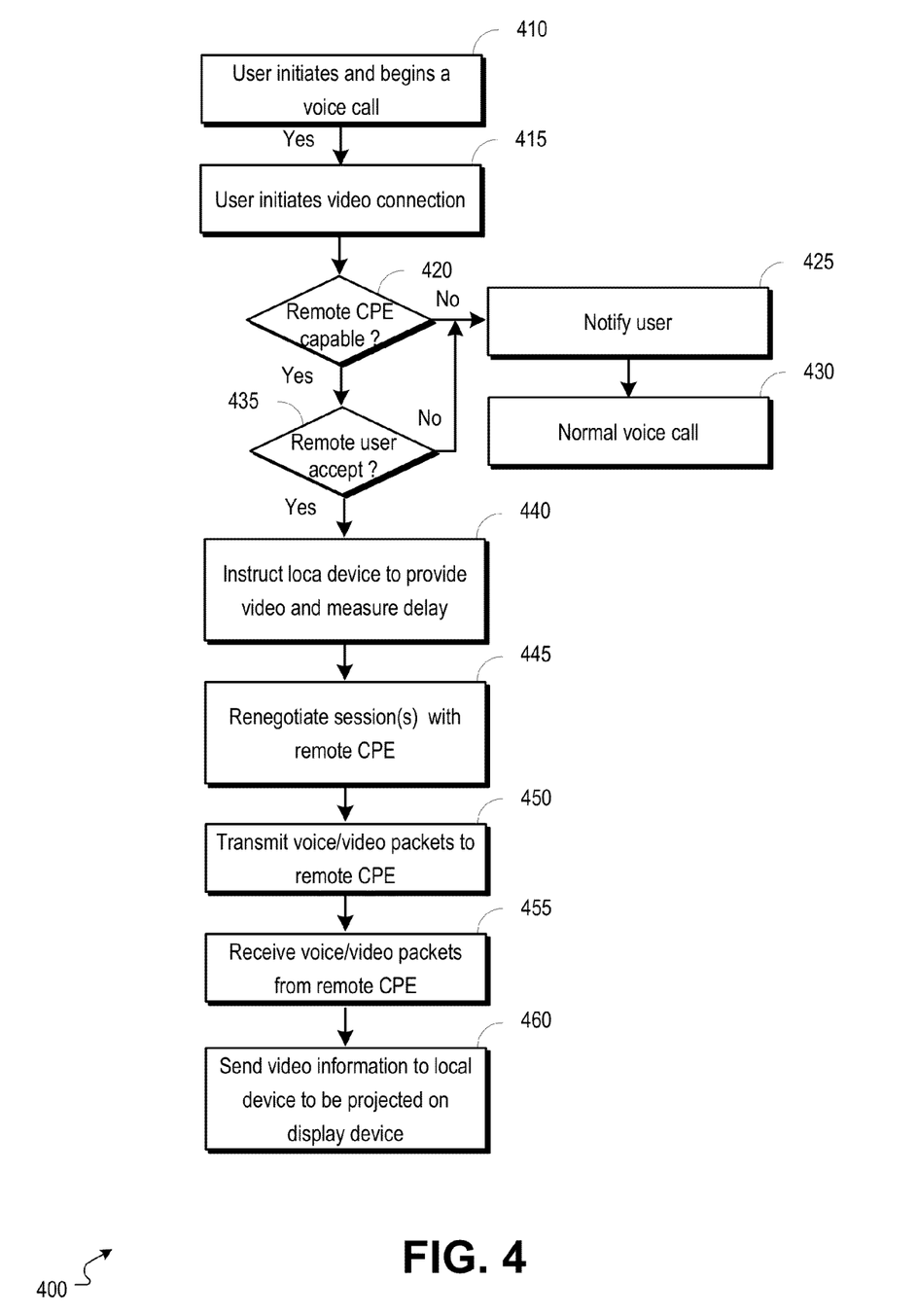
FIG. 4 is a flowchart illustrating an example process for a CPE device initiating a videophone call.

FIG. 4 is a flowchart illustrating an example process 400 for a CPE device (e.g., CPE device 110a of FIG. 1) initiating a videophone call.

At stage 410, a normal packet based voice call can be made. The normal packet based voice call can be made, for example, using a telephone (e.g., telephones 125a of FIG. 1). The voice connection can be used to provide the audio communication portion of the videophone session.

At stage 415, after the call has been answered, or at any time during the course of normal voice communication, the user can request initiation of a video connection. The video connection can be requested for initiation using, for example, the telephone keypad (telephone 125a of FIG. 1) with one or more key depressions.

At stage 420, the determination can be made if the remote CPE device (e.g., CPE device 110b of FIG. 1) is capable of supporting videophone service. If the remote CPE device (e.g., CPE device 110b of FIG. 1) is not capable of videophone service, or has videophone service disabled, the process 400 proceeds to stage 425. If the CPE device (e.g., CPE device 110b of FIG. 1) is capable of and has not disabled videophone service the process 400 proceeds to stage 435.

At stage 435, the determination can be made if the remote user desires to accept the videophone call. If the remote user accepts, the process 400 proceeds to stage 440. If the remote user rejects the videophone connection the process 400 proceeds to stage 425.

At stage 425, the user can be notified through a unique audible tone, audible tone sequence or audio or video message that the videophone connection cannot be completed or was not accepted by the receiving user. Different notifications, depending upon the reason the videophone connection was not completed, can be used.

At stage 430, the normal voice call can resume and can continue until terminated by either user.

At stage 440, the CPE devices (e.g., CPE devices 110a and 110b of FIG. 1) can send a control packet to respective local devices (local device 120a and 120b of FIG. 1), instructing the devices to start sending video packets to respective CPE devices (e.g., CPE devices 110a and 110b of FIG. 1). The CPE devices (e.g., CPE device 110a and 110b of FIG. 1) can measure the delay from the time that the control packet is sent to initiate video packet transmission to the time that the device receives the first video packet from the respective local device. The CPE devices (e.g., CPE devices 110a and 110b of FIG. 1) can use the delay measured to synchronize voice and image information.

At stage 445, the CPE device (e.g., CPE device 110a of FIG. 1) can renegotiate a session to provide a videophone service. Prior to sending video packets, the CPE device (e.g., CPE device 110a of FIG. 1) can have a voice session between telephones (e.g. telephones 125a-b of FIG. 1). The voice session may have been set up with the quality of service (QoS) associated with a packetized voice communication. A videophone session including both voice and video packets may use different QoS session parameters between the two CPE devices (e.g., CPE device 110a-b of FIG. 1). The CPE device (e.g., CPE device 110a of FIG. 1) can renegotiate the voice session with the remote CPE device (e.g., CPE device 110b of FIG. 1) using, for example, SIP (session initiation protocol), H.323 or other session control protocols dependent supported by the external network (e.g., external network 115 of FIG. 1). In other implementations, separate sessions for voice and video can be used. If the session(s) cannot be successfully renegotiated to meet the stated QoS then the process 400 proceeds to stage 425 (not shown).

At stage 450, the voice and video packets in the renegotiated session(s) can be transmitted to the remote CPE device (e.g., CPE device 110b of FIG. 1). The voice and video packets in the renegotiated session(s) can be transmitted, for example, by the CPE device (e.g., CPE device 110a of FIG. 1) through the external network. In other implementations the CPE device (e.g., CPE device 110a of FIG. 1) can transmit the voice and video packets in separate sessions. In other implementations, the CPE device ((e.g., CPE device 110a of FIG. 1) can combine the voice and video information into the same packet for transmission. To synchronize the voice and video information the CPE device (e.g., CPE device 110a of FIG. 1) can use the delay obtained in stage 440 to delay transmission of audio information to synchronize it with the video information. The CPE device can add additional delay if the far end CPE device communicates the need for additional delay during the negotiation sequence.

At stage 455, voice and video packets can be received for processing. The voice and video packets can be received, for example, by the CPE device (e.g., CPE device 110a of FIG. 1) from the remote CPE device (e.g., CPE device 110b of FIG. 1). The audio information is sent to the attached telephone (e.g., telephone 125a of FIG. 1) for amplification. Thereby, the voice communication portion of the videophone conference can occur.

At stage 460, video packets are sent. Video packets can be sent, for example, by the CPE device (e.g., CPE device 110a of FIG. 1) to the local device (e.g., local device 120a of FIG. 1) where the video images are sent to the display device (e.g., display device 140a of FIG. 1). Thereby, the video communication portion of the videophone conference can occur. Since the remote CPE device (e.g., CPE device 110b of FIG. 1) can delay transmission of the voice packets to achieve synchronization between the video and voice packets, no further synchronization is required at the receiving CPE device (e.g., CPE device 110a of FIG. 1).

Figure 5:
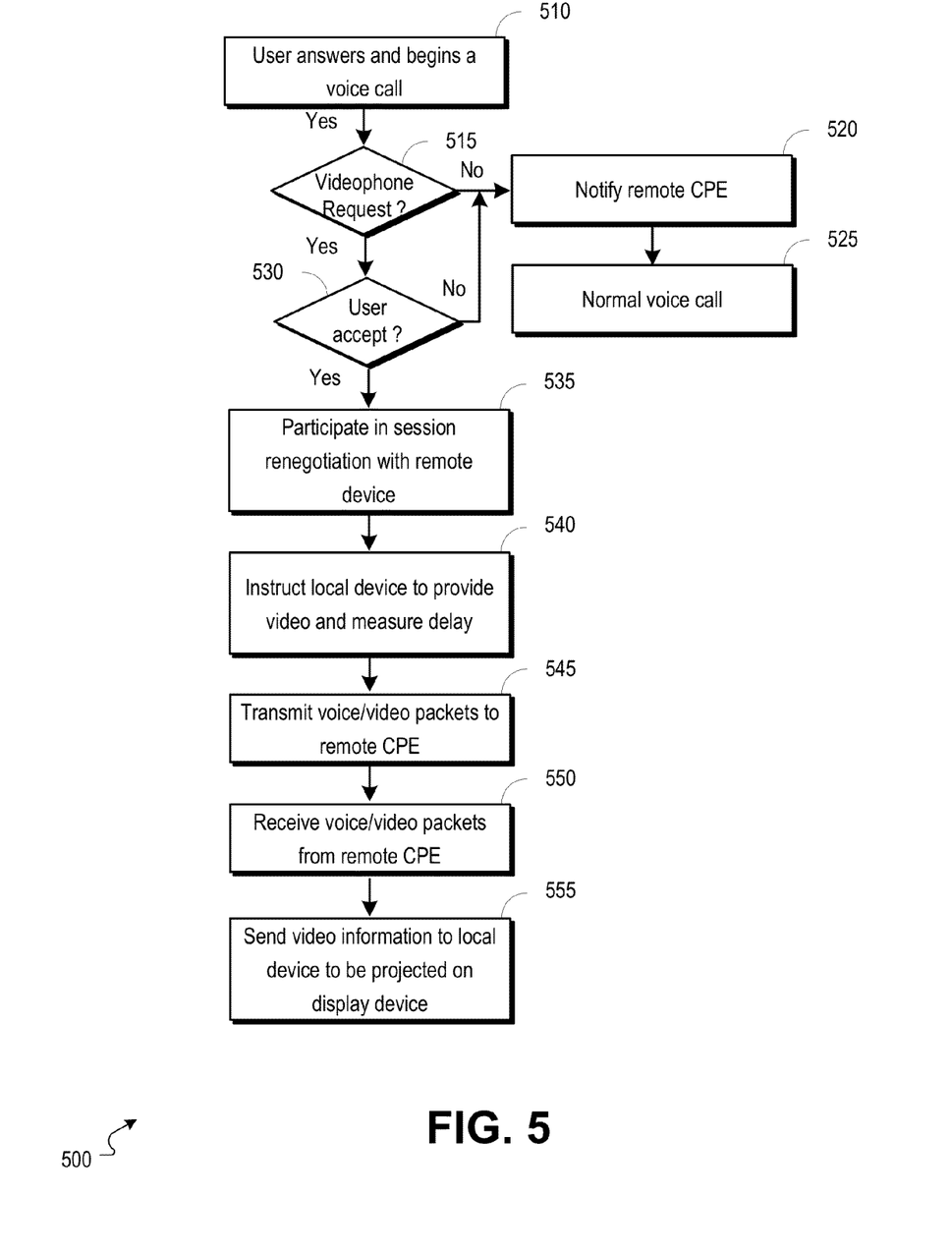
FIG. 5 is a flowchart illustrating an example process for a CPE device accepting a videophone call.

FIG. 5 is a flowchart illustrating an example process 500 for a CPE device (e.g., CPE device 110b of FIG. 1) accepting a videophone call.

At stage 510, a normal packet based voice call is received. The normal packet based voice call can be received, for example, by the CPE device (e.g., CPE device 110b of FIG. 1) from the external network (external network 115 of FIG. 1). The voice call can be answered followed by voice communication. The voice call can be used to provide the audio communication portion of the videophone session.

At stage 515, after the voice communication has been established the user can receive a request for a videophone connection. The request for the videophone connection can be received, for example, from the remote CPE device (e.g., CPE device 110a of FIG. 1). The user can decide not to accept the videophone connection where the process 500 proceeds to stage 520. The user can accept the videophone connection where the process 500 proceeds to stage 535. The CPE device (e.g., CPE device 110b of FIG. 1) can be configured to automatically accept all, reject all or provide for user acceptance for videophone connections. In other implementations videophone connection acceptance modes can be configured based on caller ID. Initiation of a videophone connection from the call terminating CPE device (e.g., CPE device 110b of FIG. 1) can be made (not shown).

At stage 520, notification can be send to the remote device. The notification can be sent, for example, by the CPE device (e.g., CPE device 110b of FIG. 1). In some implementations, notification can be through a unique audible tone, audible tone sequence or data message (e.g., voice, text or video) that the videophone connection has been rejected or could not be completed. Different notifications can be used, and can be dependent upon the reason for not completing the videophone connection. At stage 525, the normal voice call can resume and can continue until terminated by either user.

At stage 535, session renegotiation packet can be received. Session renegotiation packets can be received, for example, by the CPE device (e.g., CPE device 110b of FIG. 1) from the remote CPE device (e.g., CPE device 110a of FIG. 1). Prior to sending video packets the CPE devices (e.g., CPE devices 110a-b of FIG. 1) can have previously set up (e.g., negotiated) a voice session between telephones (e.g., telephones 125a-b of FIG. 1) The voice session may have been set up with a particular QoS (quality of service) associated with packetized voice communication. A videophone session including both voice and video packets may include different QoS session parameters for communication between the two CPE devices (e.g., CPE devices 110a-b of FIG. 1). The CPE device (e.g., CPE device 110b of FIG. 1) can participate in session renegotiation of the voice session with the remote CPE device (e.g., CPE device 110a of FIG. 1) using, for example, SIP (session initiation protocol), H.323 or other session control protocols dependent supported by the external network (e.g., external network 115 of FIG. 1). In other implementations, separate sessions for voice and video can be used. If the session(s) cannot be successfully renegotiated to meet the stated QoS then the process 500 proceeds to stage 520 (not shown).

At stage 540, control packets can be send to a local device (e.g., local device 120b) of FIG. 1). Control packets can be sent, for example, by the CPE device (e.g., CPE device 110b of FIG. 1). The control packets can instruct the local device to start sending video packets to the CPE device (e.g., CPE device 110b of FIG. 1). The CPE device (e.g., CPE device 110b of FIG. 1) can measure the delay from the time that the control packet is sent to initiate transmission of video packets to the time that it receives the first video packet.

At stage 545, voice and video packets can be transmitted using the renegotiated session(s). Voice and video packets can be transmitted, for example, by the CPE device (e.g., CPE device 110b of FIG. 1) to the remote CPE device (e.g., CPE device 110a of FIG. 1) through the external network (e.g., external network 115 of FIG. 1). In other implementations the CPE device (e.g., CPE device 110b of FIG. 1) can transmit the voice and video packets in separate sessions. In other implementations, the CPE device (e.g., CPE device 110b of FIG. 1) can combine the voice and video information into the same packet for transmission. To synchronize the voice and video information the CPE device (e.g., CPE device 110b of FIG. 1) can use the delay obtained in stage 540 to delay transmission of audio information.

At stage 550, voice and video packets are received for processing. Voice and video packets can be received, for example, by the CPE device (e.g., CPE device 110b of FIG. 1) from the remote CPE device (e.g., CPE device 110a of FIG. 1). The audio information is sent to the attached telephone (e.g. telephone 125b of FIG. 1) for amplification. Thereby, the voice communication portion of the videophone conference can occur.

At stage 555, video packets can be sent to the local device (e.g., local device 120b of FIG. 1). Video packets can be sent, for example, by the CPE device (e.g., CPE device 110b of FIG. 1) to the local device. The video images are sent by the local device to the display device (e.g., display device 140b of FIG. 1). Thus, the video communication portion of the videophone conference can occur. Since the remote CPE device (e.g., CPE device 110a of FIG. 1) can delay transmission of the voice packets to achieve synchronization between the video and voice packets, no further synchronization is required at the receiving CPE device (e.g., CPE device 110b of FIG. 1).

Figure 6:
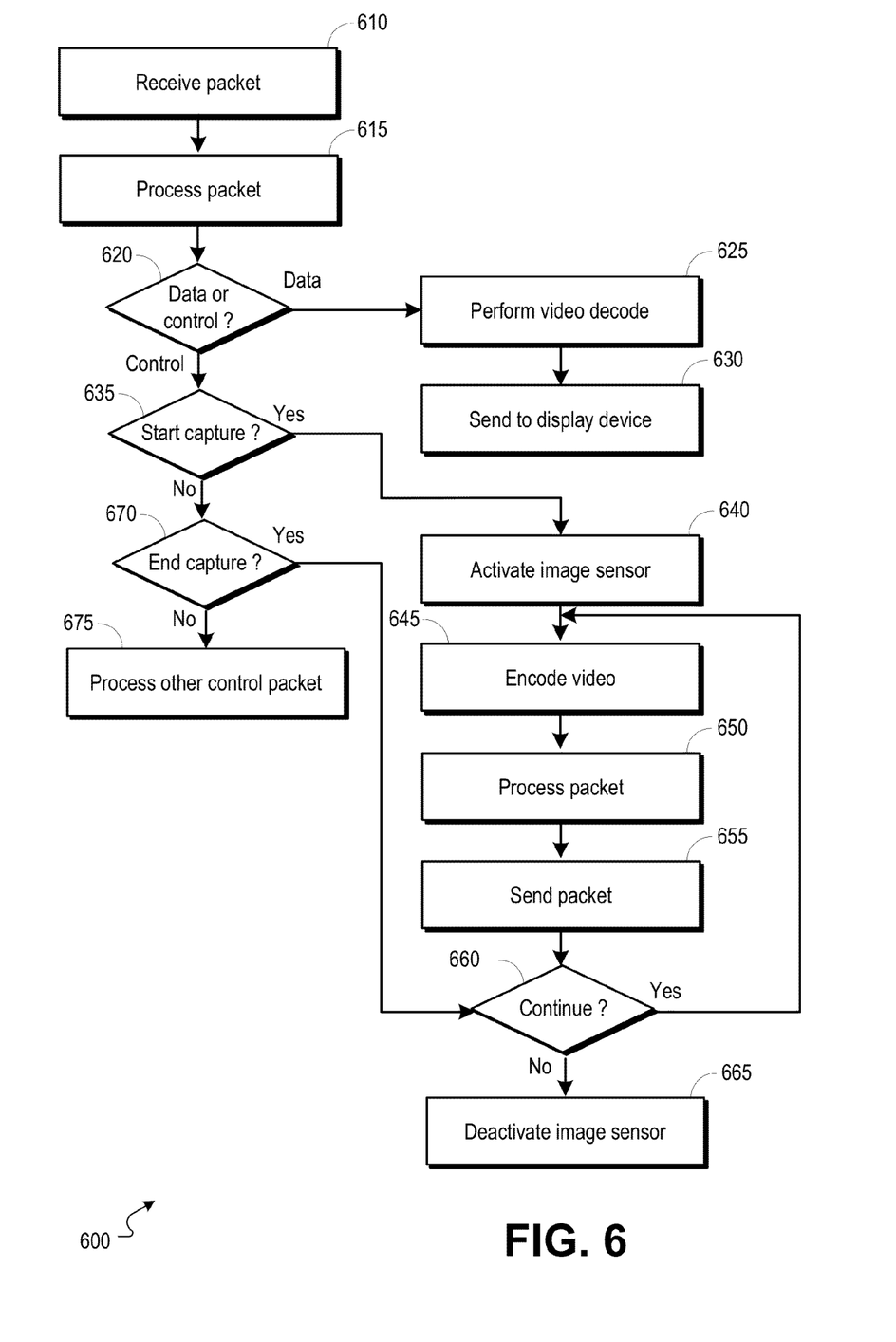
FIG. 6 is a flowchart illustrating an example process for a local device used for a videophone connection.

FIG. 6 is a flowchart illustrating an example process 600 for a local device (e.g., local device 120 of FIG. 1) used for videophone connection.

At stage 610, a packet is received from the user network (e.g., user network 135 of FIG. 1). The packet can be received from the user network, for example, by the local device (e.g., local device 120 of FIG. 1).

At stage 615, the packet is processed. The packet can be processed, for example, by the local device (e.g., local device 120 of FIG. 1). In some implementations, the local device can process the packet in accordance with the format and protocol applicable to user network (e.g., user network 135 of FIG. 1).

At stage 620, a determination is made whether the packet contains data (e.g., video) or control information. The determination can be made, for example, by the local device (e.g., local device 120 of FIG. 1). If the packet contains data, the process 600 proceeds to stage 625. If the packet contains control information, the process 600 proceeds to stage 645.

At stage 625, the data packet containing video information can be decoded. In some implementations, the data packet can be decoded in accordance with the decoding format used by the videophone service.

At stage 630, the video image is transmitted to the display device (e.g., display device 140 of FIG. 1) for viewing by the user. The video image can be transmitted to the display device, for example, by the local device (e.g., local device 120 of FIG. 1).

At stage 635, a determination is made whether the packet contains a start capture control command. The determination can be made, for example, by the local device (e.g., local device 120 of FIG. 1). If the packet contains a start capture control command, the process 600 proceeds to stage 640. Otherwise, the process 600 proceeds to stage 670.

At stage 640, image capture is initiated. Image capture can be initiated, for example, by the local device (e.g., local device 120 of FIG. 1) in conjunction with an image sensor (e.g., image sensor 320 of FIG. 3) to start capturing the video images.

At stage 645, the captured video signals are encoded. The captured video signals can be encoded, for example, by a video encoder (e.g., video encoder 330 of FIG. 3) in the local device (e.g., local device 120 of FIG. 1) after being captured by the image sensor (e.g., image sensor 320 of FIG. 3). Video signals can be encoded into a digital video format in accordance with the decoding format used by the videophone service. Note that the CPE device can instruct the local device regarding the preferred bit rate, codec or other video encoding choices to ensure compatibility with the far end devices and to accommodate the available speed and latency of the network link between the two ends.

At stage 650, the digitally encoded video information can be packetized. The packetization can be performed, for example, by the local device (e.g., local device 120 of FIG. 1). The encoded video information can be packetized into a packet format in accordance with the format and protocol applicable to user network (user network 135 of FIG. 1).

At stage 655, the video packet can be transmitted. The video packet can be transmitted, for example, by the local device (e.g., local device 120 of FIG. 1) to CPE device (e.g., CPE device 110 of FIG. 1) through the user network (user network 135 of FIG. 1).

At stage 660, a determination can be made whether to continue capturing video images for the videophone service. The determination can be made, for example, by the local device (e.g., local device 120 of FIG. 1). If the local device (e.g., local device 120 of FIG. 1) should continue to capture video images, the process 600 proceeds to stage 645. If the capturing of video images should not be continued, the process 600 proceeds to stage 665.

At stage 665, the image sensor can be deactivated. The image sensor can be deactivated, for example, by the local device (e.g., local device 120 of FIG. 1), thereby no longer capturing video images for the videophone service.

At stage 670, a determination is made whether the packet contains an end capture control command. The determination can be made, for example, by the local device (e.g., local device 120 of FIG. 1). If the end capture control command is received, the process 600 proceeds to stage 660. Otherwise, process 600 proceeds to stage 675.

At stage 675 the packet containing control information other than start or end video capture commands is processed. The packet can be processed, for example, by the local device (e.g., local device 120 of FIG. 1).

Figure 7:
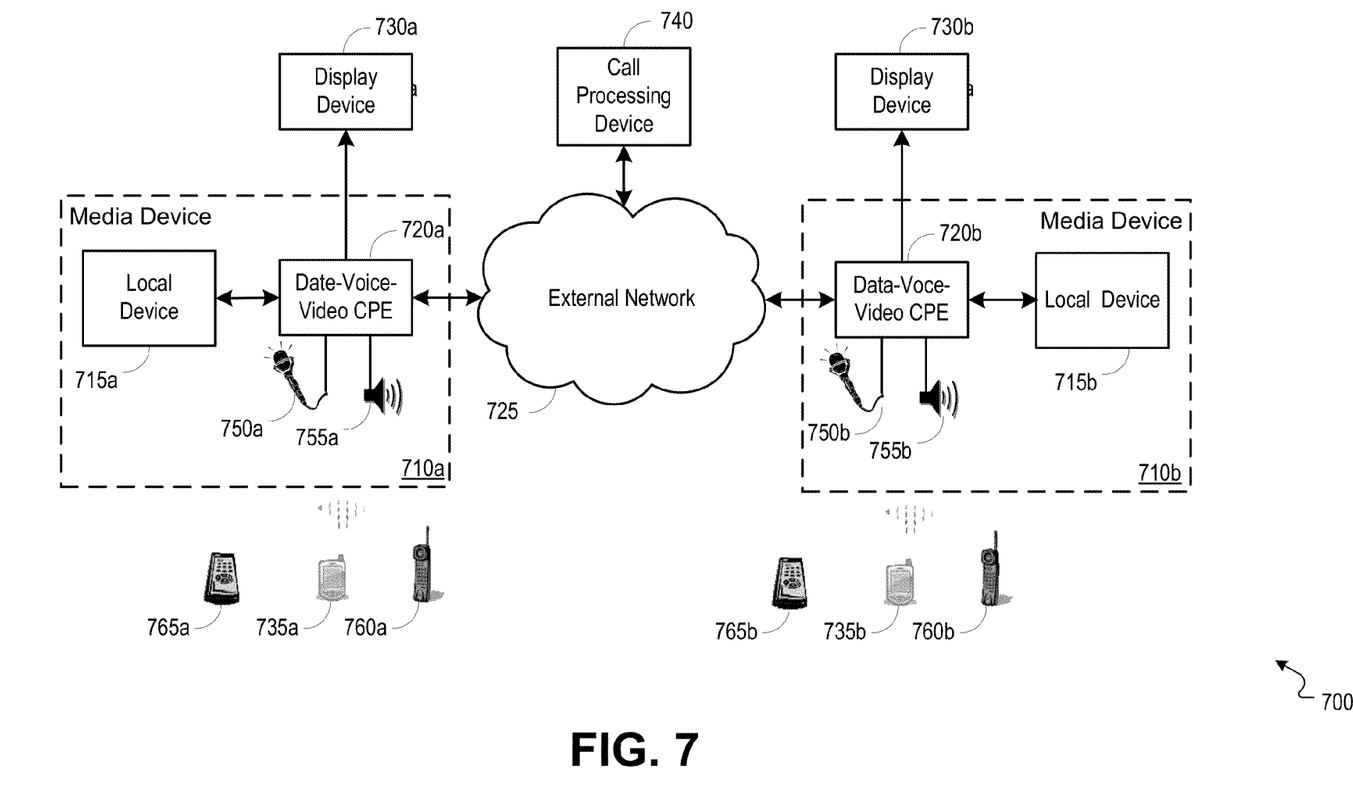
FIG. 7 is a block diagram illustrating another implementation operable to provide videophone service.

FIG. 7 is a block diagram illustrating other implementations operable to provide videophone service. The implementations of a videophone described in FIG. 1 can provide videophone service through the introduction of a local device (e.g., local device 120 of FIG. 1) using a standard display device (e.g., display device 140 of FIG. 1) and standard CPE device (e.g., CPE device 110) providing packetized voice services. FIG. 7 is a block diagram illustrating other implementations where the videophone service is further optimized through integration of the components described in FIG. 1 and can provide improved user interaction and service capabilities.

Media devices 710a-b can integrate a local device 715 that can capture video images for use in videophone communications. In other implementations, local device 715 can be external to the media device 710 (not shown) and can be a webcam similar to the ones provided by Logitech, Inc. of Fremont, Calif. through wired or wireless interfaces.

Media devices 710a-b can provide a data-voice-video CPE 720a-b. Some implementations of data-voice-video CPE 720 can be through the integration of a voice/data CPE device (e.g., EMTA) within a set-top box. The data-voice-video CPE 720a-b can provide packetized data and voice communication services through external network 725. CPE 720a-b devices can also provide access to broadcast analog/digital SD (standard definition/HD (high definition), SDV (switch digital video), VOD (video-on-demand) and IP based video. External network 725 can be an internet protocol (IP), asynchronous transfer mode (ATM) or other packet switched based network. Access to the external network 725 can be provided through a hybrid fiber coax (HFC) cable (e.g., DOCSIS), fiber or wireless network.

Video images can be displayed on display devices 730a-b. The display devices 730a-b can be television sets or monitors using HDMI, component video, S-Video, video (single RCA plug) or VGA interfaces. In other implementations video images can also be displayed multi-media/smart-phones 735a-b and personal computers (not shown) through wired and wireless networks. Wired network implementations can include ethernet, MoCA (Multimedia over Cable Alliance) or power line based networks, among many others. Wireless network implementations can include 802.11 or G.hn, among many others.

Call processing device 740 can be used to setup a videophone or voice connection between media device 710a and 710b. Call processing device 730 can provide control plane functionalities for sending and receiving control information to and from media devices 710a and 710b to set up a voice or videophone calls. Once the call has been set up, media devices 710a and 710b can exchange voice and video packets enabling voice or videophone communication.

Voice calls or the audio portion of a videophone call can be provided with microphones 750a-b and speakers 755a-b. The microphones 750a-b and speakers 755a-b can be standalone or integrated in media device 720a-b. In other implementations, the voice or audio portion of a videophone call can be provided through a wireless phone 755a-b, wired phone (not shown), multi-media/smart-phones 735a-b and personal computers (not shown).

Remote controls 755a-b can be used to control a videophone sessions and can work in conjunction with graphical user interface (GUI) on the display device. For example, a GUI could provide an address book to initiate voice and videophone calls. Other examples can include controlling the zoom, pan, tilt and focus of the image sensor in the video capture device 715a-b. Remote controls can be implemented with a cordless phone, smart phone, television remote, cordless keyboard (not shown) or standard wired phone (not shown).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Figure 8:
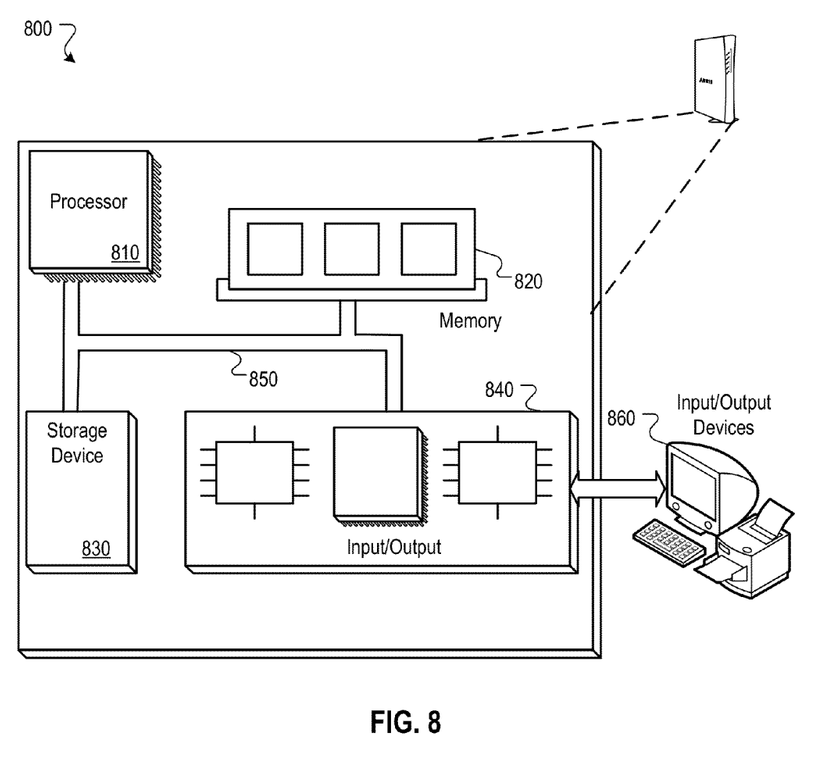
FIG. 8 is a block diagram of an example controller that can be used in a CPE device and video device.

FIG. 8 is a block diagram of a controller for a CPE device (e.g., controller 210 of FIG. 2) and for a local device (e.g., local device 310 of FIG. 3). The controller device 800 can include a processor 810, a memory 820, a storage device 830, and an input/output device 840. The scaling (e.g., processor performance, memory size, storage type and input/output devices) of processor 810, memory 820, storage device 830 and input/output device 840 can be different for the CPE (e.g., CPE device 130 of FIG. 1) and local device (local device 130 of FIG. 1) controllers. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the device 800. In one implementation, the memory 820 is a computer-readable medium. In one implementation, the memory 820 is a volatile memory unit. In another implementation, the memory 820 is a non-volatile memory unit. In another implementations the memory 820 is a combination of volatile and non-volatile memory units.

In some implementations, the storage device 830 is capable of providing mass storage for the device 800. In one implementation, the storage device 830 is a computer-readable medium. In various different implementations, the storage device 830 can, for example, include a hard disk device, an optical disk device, flash memory or some other large capacity storage device.

The input/output device 840 provides input/output operations for the device 800. In one implementation, the input/output device 840 can include one or more of a wireless interface, HFC network interface, such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory, flash memory or a random access memory or all. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A system, comprising:
an external network operable to provide network communication services;
a user local area network operable to provide local area network communication services;
a commercially available customer premise equipment (CPE) device operable to provide packet based telephony and data services through the external network, communication with local devices through the user local area network, and communication with plain old telephone service (POTS) devices through in home twisted pair wiring, the CPE device being operable to establish voice communication between a user of a local POTS device and a remote POTS device, and after voice communication is established, to receive input from the POTS device to establish a video connection between a local user associated with the local POTS device and a remote user associated with the remote POTS device;
a local computing device operable communicate over the user local area network and receive a request from the CPE device to initiate a video session, and to display video information on a display device in response to the request, wherein video information is received from the CPE device through the user local area network, and the local computing device is further operable to capture and provide packet video information to the CPE device through the user local area network; and
wherein the CPE device is operable to provide a videophone service to the local user based on the combination of the local computing device and local POTS device by modifying only its operating software image and providing the voice session to the local POTS device and the video session to the local computing device over the user local area network responsive to a request to instantiate the session receive from the local user through the local POTS device.

2. The system of claim 1, wherein the voice portion of the videophone service received by the CPE device is reproduced on a speaker associated with a standard phone attached to the CPE device.

3. The system of claim 1, wherein the voice portion of the videophone service received by the CPE device is transmitted as a packet through the user network to the local device and reproduced on an external speaker or the display device.

4. The system of claim 1, wherein access to the external network is provided by a DOCSIS cable access network, digital line subscriber (DSL) access network, or fiber optics based access network.

5. The system of claim 1, wherein the user network comprises a wireless network.

6. The system of claim 1, wherein the user network comprises a wired network.

7. The system of claim 1, wherein a external image device is interfaced to the local device to provide video images to the local device.

8. The system of claim 7, wherein the user network is based on MoCA (Multimedia over Cable Alliance).

9. One or more non-transitory computer-readable media having instructions stored thereon, the one or more computer readable media, when executed by a processor to perform operations comprising:
upgrading an operating software image on a deployed customer premise equipment (CPE) device to provide a videophone services, the deployed CPE device being incapable of providing videophone services prior to the upgrade;
establishing a packet based telephony service between a first CPE device and a second CPE device over an external network;

requesting a packet based videophone service from the first CPE device to the second CPE device over the external network;

notifying the first CPE device if the videophone service is accepted or rejected from the second CPE device; and establishing a videophone service between the first and second CPE devicess.

10. The one or more computer-readable media of claim 9, wherein one or more sessions are used to provide the videophone service.

11. The one or more computer-readable media of claim 10, wherein QoS parameters for the one or more sessions are renegotiated after the telephony service has been established.

12. The one or more computer-readable media of claim 11, wherein a session initiation protocol (SIP) is used to renegotiate the one or more session QoS parameters.

13. The one or more computer-readable media of claim 11, wherein a H.232 protocol is used to re-negotiate the one or more session QoS parameters.

14. The one or more computer-readable media of claim 9, wherein the audio and video information is synchronized prior to transmission on the external network.

15. The one or more computer-readable media of claim 9, wherein the audio and video information received from the external network is synchronized when the audio information is heard on an attached telephone.

16. The one or more computer-readable media of claim 9, wherein a videophone session is initiated through the keypad on a standard telephone.

* * * * *